(12) United States Patent
Lee et al.

(10) Patent No.: US 11,347,129 B2
(45) Date of Patent: May 31, 2022

(54) RPHASE-CONTROLLED OPTICAL WAVEGUIDE ANTENNA ARRAY (71) Applicant: National Taiwan University of Science and Technology, Taipei (TW)

(72) Inventors: San-Liang Lee, Taipei (TW); Chia-Hsuan Yang, Tainan (TW); Tsung-Han Lee, New Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 17/112,188

(22) Filed: Dec. 4, 2020

(65) Prior Publication Data

US 2021/0325762 A1 Oct. 21, 2021

(30) Foreign Application Priority Data

Apr. 21, 2020 (TW) .................................. 109113361

(51) Int. Cl.
*G02F 1/29* (2006.01)
*G01S 7/481* (2006.01)

(52) U.S. Cl.
CPC .............. *G02F 1/292* (2013.01); *G01S 7/481* (2013.01)

(58) Field of Classification Search
CPC ...... G02F 1/292; G01S 7/481; G02B 6/12009; G02B 6/12011; G02B 6/12033; G02B 6/29301
See application file for complete search history.

(56) References Cited

U.S. PATENT DOCUMENTS 10,983,273 B1 * 4/2021 Phare ................. G02B 6/12014

* cited by examiner

*Primary Examiner* — John Bedtelyon
(74) *Attorney, Agent, or Firm* — WPAT, PC (57) ABSTRACT

A phase-controlled optical waveguide antenna array including an optical splitter, an array of phase shifters, and an optical waveguide antenna array is disclosed. The optical splitter divides the input light to a plural of optical waveguides, the phase shifter is connected to an optical waveguide of the optical splitter, and the optical waveguide antenna array is connected with the phase shifters. The optical waveguide antenna array employs periodic block structure to output a uniform light beam, and the phase shifters are tuned with adjacent thermal heaters to steer the output beam angle of the optical waveguide antenna array.

11 Claims, 9 Drawing Sheets

PHASE-CONTROLLED OPTICAL WAVEGUIDE ANTENNA ARRAY

CROSS REFERENCE TO RELATED APPLICATION

This application claims the benefits of Taiwan application Serial No. 109113361, filed on Apr. 21, 2020, the disclosures of which are incorporated by references herein in its entirety.

FIELD

The present disclosure relates in general to a phase-controlled optical waveguide array and, in particular, to a phase-controlled optical waveguide array with specially designed side diffraction structure design.

BACKGROUND

Due to the burgeoning developments in the fields of self-driving car, unmanned aerial vehicle (UVA) and machine vision, the demands for optical phase-controlled beam scanning unit used in light detection and ranging (LiDAR) increase accordingly year after year. The beam scanning unit as described may be composed of phase-controlled optical waveguide antenna array.

Comparing to phase-controlled optical waveguide array, traditional optical radar achieves beam scanning through mechanically rotating the mirror surface. However, mechanical rotating exhibits lower scanning speed, and the operation can be easily affected by vibration and physical attrition. Even further, optical systems with mechanical rotation function tend to be bulky, which consumes a huge amount of power (energy) when under operation and thus limits the capability. These systems can only mechanically control the optical beams. However, they cannot alter the shape of far-field waveform according to different demands.

Phase-controlled optical waveguide array is composed of phase shifter array and optical waveguide antenna array, as compared to traditional optical radar. The optical waveguide antenna array is distributed in certain area, and each optical waveguide antenna can be used to control the phase though signal controlling. By controlling the phase, the beam angle and waveform emitted by the optical waveguide array can be further controlled.

The design of an optical waveguide antenna array is the key to beam transmitting angle and waveform. Furthermore, arbitrary wavefront can be achieved by controlling the phase of the phase shifter array, for far more advanced communication and sensing.

SUMMARY OF THE DISCLOSURE

According to one of the purposes of the present invention, a phase-controlled optical waveguide antenna array is provided. The phase-controlled optical waveguide antenna array includes an optical splitter, dividing an input light signal to a plurality of optical waveguides; an array of phase shifters, with one phase shifter among the array being connecting with one output optical waveguide of the optical splitter; and an optical waveguide antenna array, with optical waveguide antenna among the array being connecting with the phase shifter. A periodic block structure is provided on each side of each optical waveguide antenna to provide optical diffraction and to decrease the optical coupling between the waveguide antennas.

Preferably, the optical splitter is a one-to-N multimode interference.

Preferably, the optical splitters are connected in series to form a tree-like multi stage structure.

Preferably, the optical splitter divides the light signal into two paths, and the light ratio for each path are substantial identical.

Preferably, the periodic block structure forms a serial rectangular waveguide structure.

Preferably, the width of the periodic block structure gradually varies along the direction of an antenna.

Preferably, the duty cycle of the periodic block structure gradually varies along a direction of an antenna.

Preferably, the periodic block structure is connected with a narrow width waveguide.

Preferably, the phase shifter is implemented as a waveguide close to a heating element.

Preferably, the phase shifter is an electrode-controlled phase modulator.

Preferably, the material for the serial rectangular waveguide structure is silicon.

Preferably, the two periodic block structures surrounding an optical waveguide have a relative phase shift or position shift along the antenna direction.

BRIEF DESCRIPTION OF THE DRAWINGS

The present invention will be apparent to those skilled in the art from the following detailed description of the preferred embodiments, with reference to the attached drawings, in which.

DETAILED DESCRIPTION

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Generally speaking, the design of a phase-controlled optical waveguide antenna array can be divided into three parts, the optical splitter, the phase shifter and the optical waveguide antenna array.

Referring to splitter firstly. Two main streams are the trends for optical splitter design, one being multimode interference, and the other one being cascaded directional coupler. For multimode interference, it exhibits more precise optical splitting ratio, and maintains the ratio on each channel after multiple stage of tree structure. Multimode interference also has broader wave bandwidth. On the other hand, cascaded directional coupler is with the advantages of adjustable optical ratio and low optical transmission loss, but it's harder for cascaded directional coupler to precisely control the ratio due to it being sensitivity during manufacturing.

Phase shifter may be referred to a segment of waveguide, with a heating element disposed close thereto. By heating up by the heating element, the refraction coefficient and the phase of the waveguide may be changed. Alternatively, the waveguide may be doped into a P type or N type phase modulator. In this regard, the refraction coefficient and the phase of the doped waveguide may also be changed in response to the current injected into the electrode or a bias voltage. In sum regarding phase shifter, it can be understood that phase shifter can be roughly categorized into these two main types. With respect to the advantages, thermal phase shifters possesses broad adjustable phase, and the design thereof is relatively easy. For phase modulator, the modulation speed is higher, but the adjustable phase is relatively smaller, and the light loss is higher. In addition, the configuration for shifters in an optical waveguide antenna array may affect the complexity of a control circuit.

Optical waveguide antenna is much more diverse. Depending on optical diffraction, optical waveguide antenna can be classified into three main categories. The first class is the so called shallow etched sidewall-grating waveguide. Shallow etched sidewall-grating waveguide is the most compatible element to current CMOS manufacturing process. It is manufactured through lithography process, producing zigzag-shaped waveguide by dry etching. Shallow etched sidewall-grating waveguide has higher diffraction rate, which makes it harder to achieve uniform light emission when manufacturing waveguide antenna. Also, the controlling of the diffraction rate over lithography for etching zigzag-shaped notch may be limited.

The second class is the waveguide grating with polysilicon overlay and oxide etch stop layer. This grating of the waveguide of the second class is to make a polysilicon on top of the waveguide. The grating's parameters such as period, width, thickness and materials parameters cay be tuned through lithography, and the antennas' light emission amount and uniformity may be flexibility adjusted. The second class of the waveguide however exhibits disadvantages that extra definition for material pattern is needed and much more complicated manufacturing process.

The third class is the two-dimensional bulk photonic crystal waveguide. The class of the waveguide uses the multi paths phase interferences of photons to emit lights. Multiple two-dimensional orifices photon body waveguide form a two-dimensional orifices array, within which the design of optical splitter may be omitted, so that the design of antennas may be simplified. However, since photon body principles are used in the third class waveguide, precise and delicate simulation and manufacturing process are needed, which raises the difficulties to implement. In addition, phase shifter may not be used in the third class waveguide, so that the light emitting angle of the antenna may only be controlled over changing the wave length of the laser.

Figure 1:
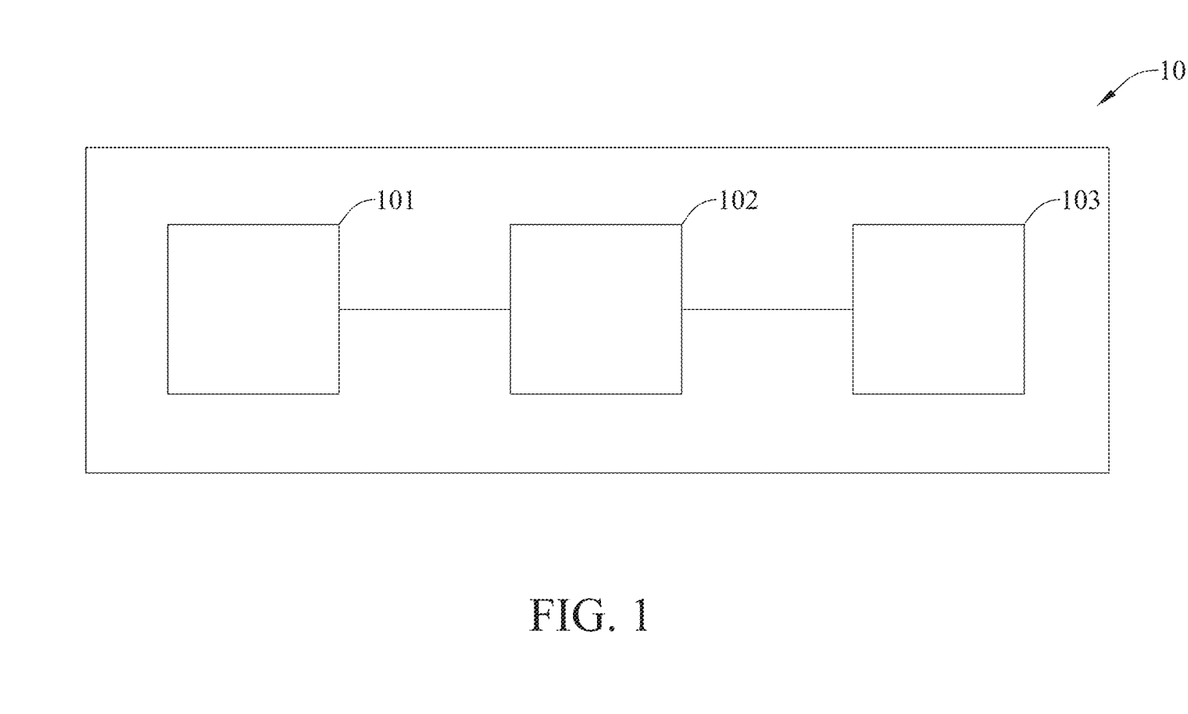
FIG. 1 is a schematic view of a phase-controlled optical waveguide antenna array according to an embodiment of the present invention.

Reference is then made to FIG. 1, which is a schematic view of a phase-controlled optical waveguide antenna array according to an embodiment of the present invention. In the present invention, the phase-controlled optical waveguide antenna array may be, but not limited to, manufactured through standard CMOS (complementary metal-oxide-semiconductor) structure. As shown in FIG. 1, the phase-controlled optical waveguide antenna array 10 includes an optical splitter 101, a phase shifter 102 and an optical waveguide antenna array 103.

Figure 2:
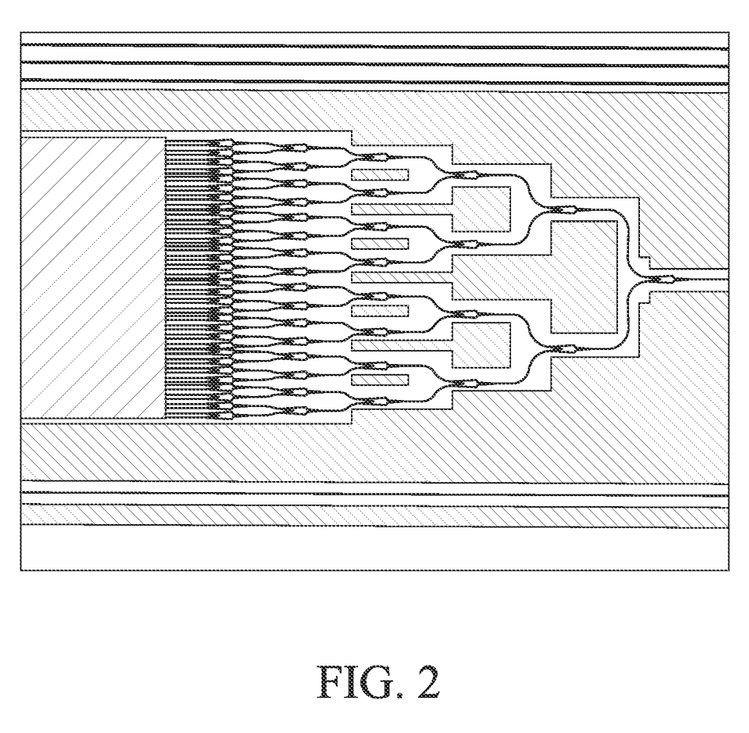
FIG. 2 is a schematic view of an optical waveguide antenna array without a phase shifter according to an embodiment of the present invention.

Reference is made to FIGS. 1 and 2 collectively, where FIG. 2 is a schematic view of an optical waveguide antenna array without a phase shifter according to an embodiment of the present invention. As shown in FIG. 2, the optical spited 101 in the present embodiment is a series of one-to-two multi modes interferometers connected in multi stages. Each of the one-to-two multi modes interferometers exhibits a 50%:50% light splitting ratio. The optical splitters 101 are connected in series to form a tree-like multi stage structure. In this regard, the output light intensity of the multi channels may be uniformed in the present invention. The one-to-two multi modes interferometer as described in the present embodiment is only for exemplary purpose, and that the optical splitter 101 should not be limited to one-to-two multi modes interferometer only.

Figure 3:
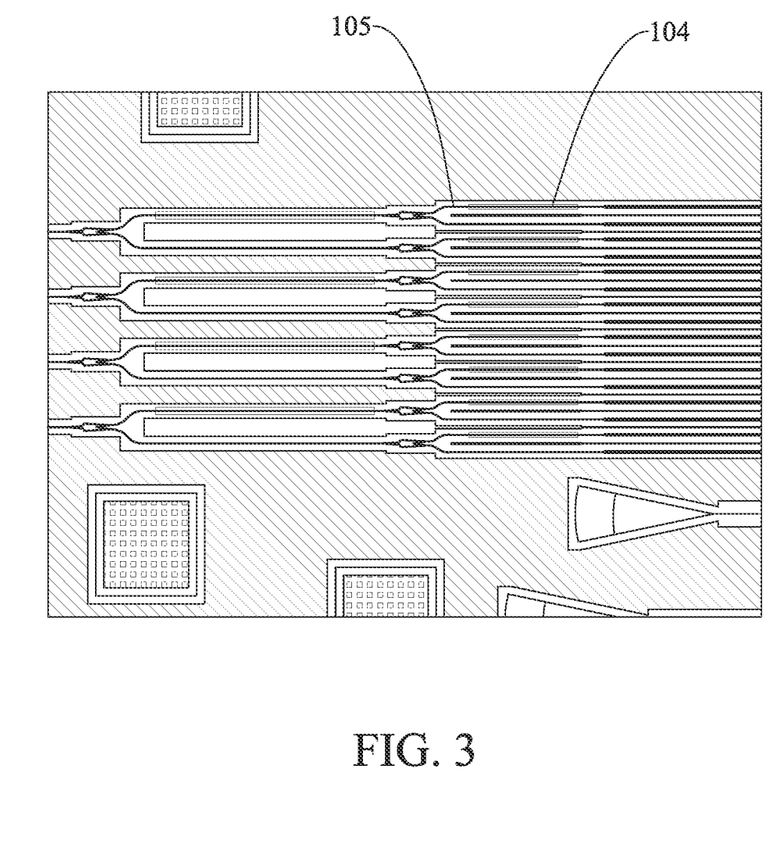
FIG. 3 is a schematic view of the optical splitter and phase shifter of the phase-controlled optical waveguide antenna array according to an embodiment of the present invention.

Reference is next made to FIGS. 1 and 3 collectively. FIG. 3 is a schematic view of the optical splitter and phase shifter of the phase-controlled optical waveguide antenna array according to an embodiment of the present invention. As shown in FIG. 3, the design of the phase shifter 102 of the present embodiment is implemented as arranging a heating element 104 on top of the optical waveguide 105 to partially heat up the optical waveguide 105. By such implementation, the phase shifter 102 of the present invention is implemented as a resistor heater utilizing resistive heating effect to heat up the optical waveguide 105. The heating element 104 may be implemented as a piece of metal or a resistor made of semiconductor manufacturing. To be more specific, when the metal heating element 104 is providing heat, is raises the temperature of the optical waveguide 105. The thermal-optical effect of the optical waveguide 105 changes the effective reflection of the optical waveguide 105, resulting in phase differences between the traversing light in the optical waveguide 105. The traversing lights of each adjacent channels are adjusted so that phase differences are generated, so that an array of phase differences is provided to an array of optical waveguide antenna. The phase difference of each optical waveguide antenna is used to form an interference control beam emission angle and field pattern. FIG. 3 shows that the optical waveguide 105 is covered by the metal heating element 104.

Figure 4:
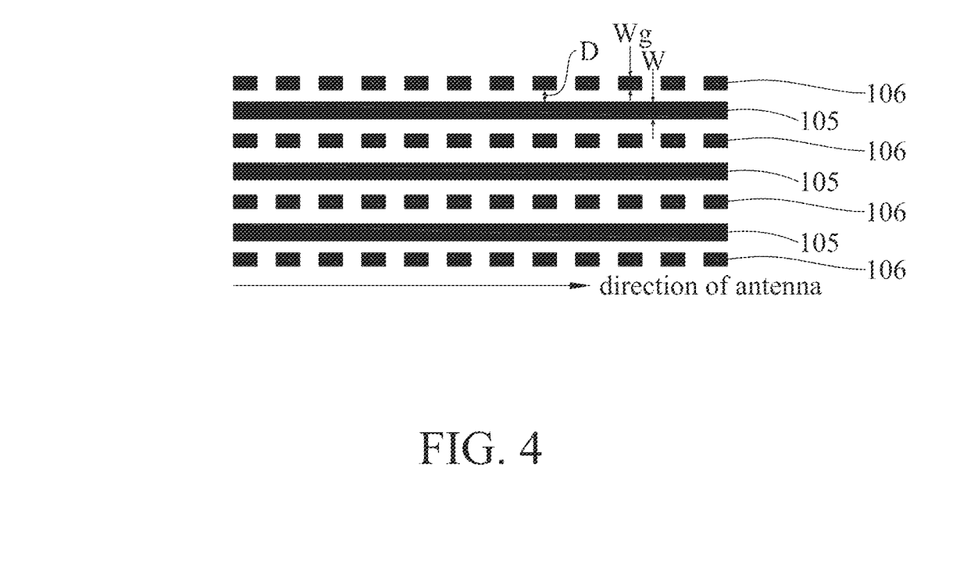
FIG. 4 is a first partial view illustrating the optical waveguide antenna of the phase-controlled optical waveguide antenna array according to an embodiment of the present invention.
Figure 5:
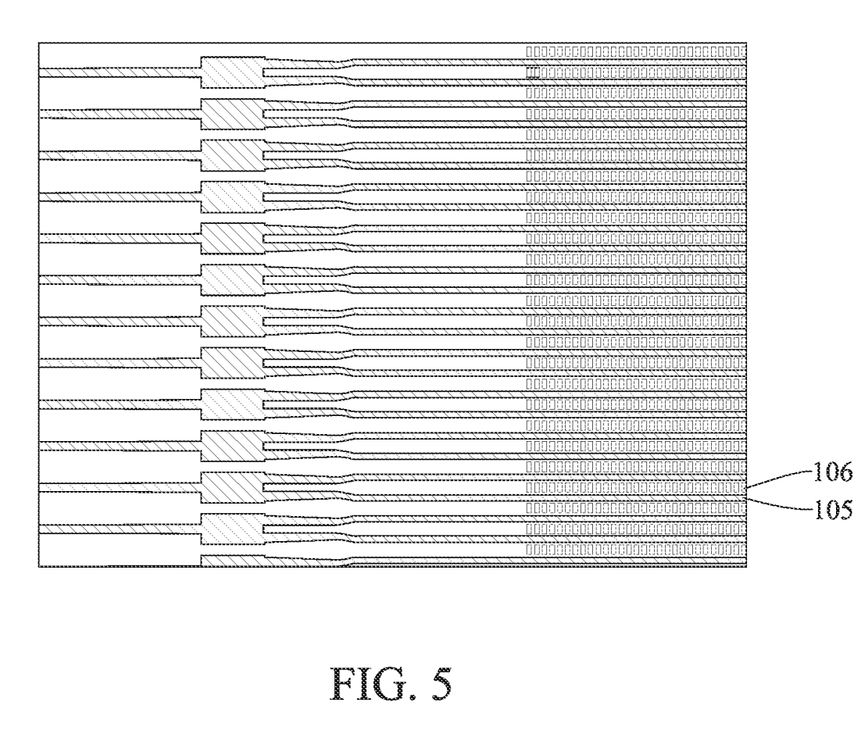
FIG. 5 is an enlarged view illustrating the optical splitter and the waveguide antenna of the phase-controlled optical waveguide antenna array according to an embodiment of the present invention.

Reference is next made to FIGS. 1 and 4-5. FIG. 4 is a first partial view illustrating the optical waveguide antenna of the phase-controlled optical waveguide antenna array according to an embodiment of the present invention, and FIG. 5 is an enlarged view illustrating the optical splitter and the waveguide antenna of the phase-controlled optical waveguide antenna array according to an embodiment of the present invention. Phase shifter is not shown in FIG. 5. As shown in FIG. 4-5, the periodic side block structure 106 that is gradually-varied in width is utilized in the present invention to achieve uniform light emission and to isolate the interaction between adjacent optical waveguide 105. Further in FIG. 4, the periodic of the periodic side block structure 106 is P, the width of the periodic side block structure 106 is Wg, and the distance between the periodic side block structure 106 and the optical waveguide 105 is D. The W as shown in FIG. 4 is the width of the optical waveguide 105. These parameters may be fine-tuned (or be optimized) to achieve: (1) the optical waveguide 105 being a single mode waveguide; and (2) Wg and D being adjusted along the traversing light direction to achieve uniform light emission. The structure and material selected for the optical waveguide are related to optimization, and Wg and D varies along the direction of the antenna.

Reference is collectively made to FIGS. 1 and 4-5 once again. The optical waveguide antenna array 103 as disclosed in the present invention can achieve the effectiveness of uniform light emission, and the radiation angle is close to 90 degree. As can be seen in FIGS. 4-5, the periodic side block structure 106 are in rectangular shape and arranged in series, the periodic side block structure 106 can isolate the interaction caused by different lights with different phases between the optical waveguide 105, so as to make the arrangement of the optical waveguide 105 to be tighter. In the present invention, the design for the optical waveguide antenna array 103 is through adjusting the width (Wg) of the periodic side block structure 106 and adjusting the distance (D) between the periodic side block structure 106 and the optical waveguide 105, to hold the lights from coupling to the periodic structure, and to decrease the side lobe of the radiating lights and to adjust the uniformity of lights. It should be noted that the duty cycle of the periodic block structure may gradually vary along a direction of an antenna.

Figure 6:
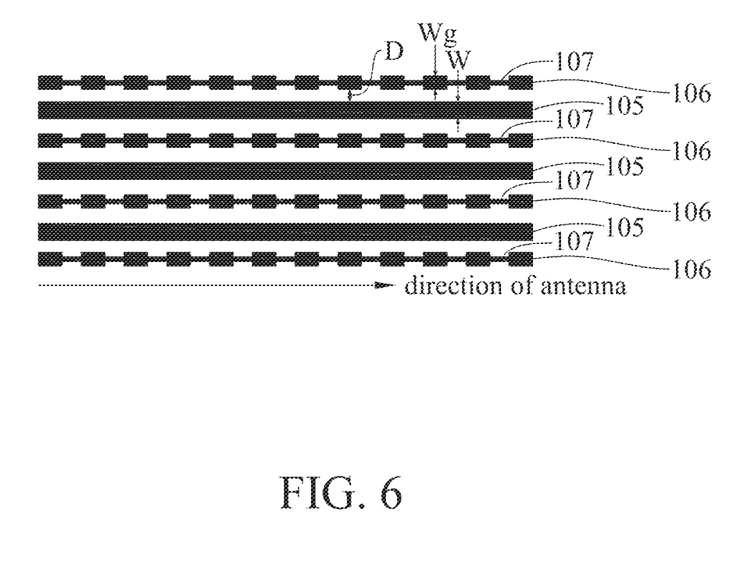
FIG. 6 is a second partial view illustrating the optical waveguide antenna of the phase-controlled optical waveguide antenna array according to an embodiment of the present invention.

Reference is next made to FIG. 6. FIG. 6 is a second partial view illustrating the optical waveguide antenna of the phase-controlled optical waveguide antenna array according to an embodiment of the present invention. Since the structure shown in FIG. 6 is similar to that shown in FIG. 4, so that the same element number will be continually used. As shown in FIG. 6, the difference is that the periodic block structure 106 is connected with a narrow width waveguide 107 in FIG. 6. By connecting the periodic block structure 106 and the narrow width wave-guide 107, the effectiveness of increasing the manufacturing uniformity can be achieved, as well as the flexibility of optimal structure. In addition, the material for the serial-connected rectangular waveguide structure shown in FIGS. 4 and 6 may be, but not limited to, silicon. It should also be noted that the duty cycle of the periodic block structure may gradually vary along a direction of an antenna.

Figure 7:
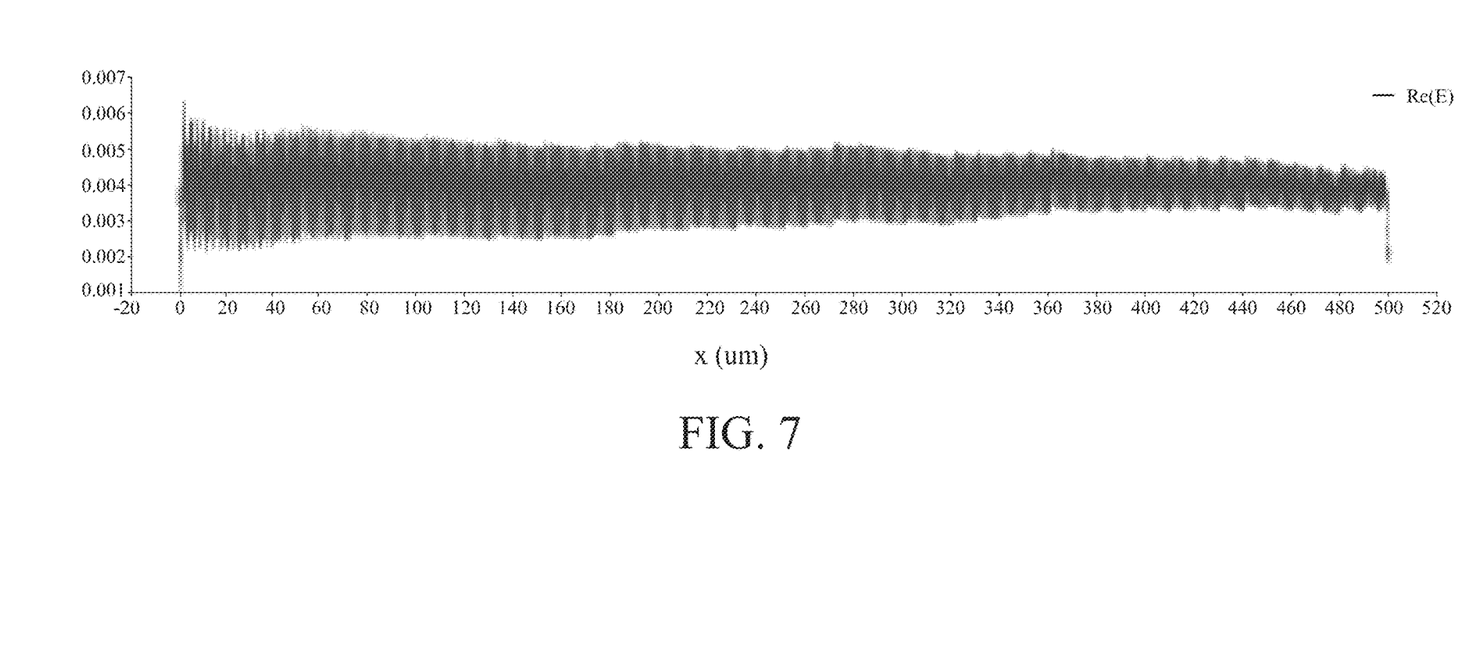
FIG. 7 is a schematic view illustrating the simulation near field distribution of the optical waveguide antenna array according to an embodiment of the present invention.

Reference is next made to FIG. 7, which is a schematic view illustrating the simulation near field distribution of the optical waveguide antenna array according to an embodiment of the present invention. As can be seen in FIG. 7, after being optimized, the optical waveguide antenna array is simulated for light emission performance with a 500 um wavelength to show the distribution of the light intensity. Moreover, according to the simulation of the present embodiment, the light propagation in the present invention possesses better light limitation than other waveguides. When the distance between the center of the waveguide and the center of the gradually-varied width periodic structure is under 1 um, the coupling length of is 368 um longer than those of the waveguide without such periodic structure. The Re(E) in FIG. 7 represents the real part of the electric field of the output light field.

Figure 8:
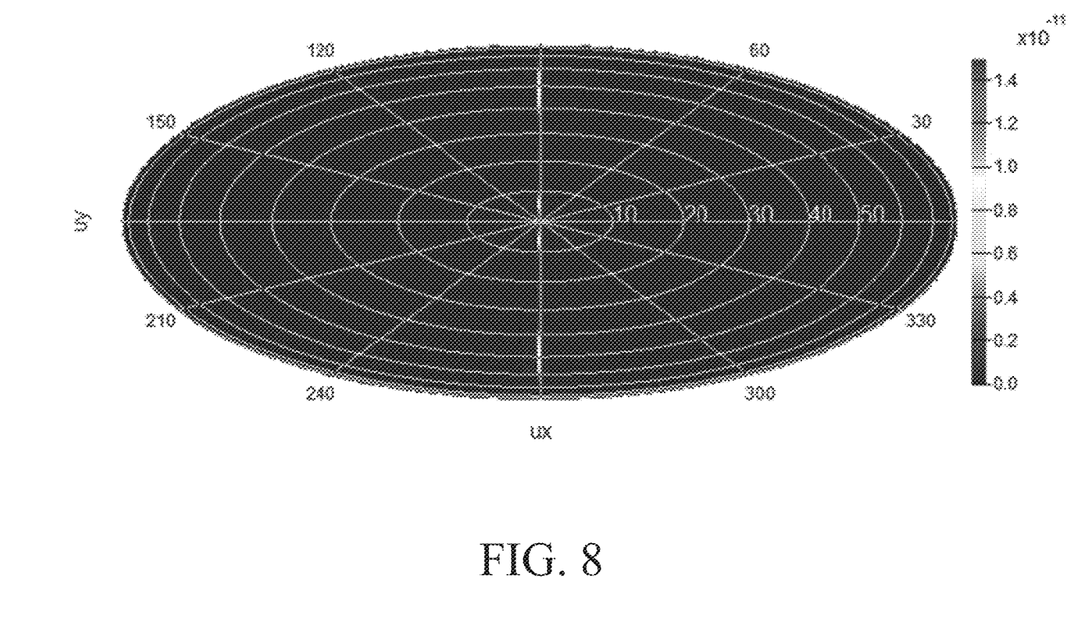
FIG. 8 is a schematic view illustrating the simulation of the far field distribution of the optical waveguide antenna array according to an embodiment of the present invention.

Reference is finally made to FIG. 8, which is a schematic view illustrating the simulation of the far field distribution of the optical waveguide antenna array according to an embodiment of the present invention. The simulation data is transformed into a far field intensity distribution chart. As can be seen in FIG. 8, when the distance between the optical waveguide antennas is 2.09 um, the far field waveguide generates side lobe at the perpendicular direction. The full width at half maximum of the beam is 0.12 degree, and the two side lobes (may be filtered out by other optical approach) are approximately at +/−50 degree at the two sides.

Figure 9:
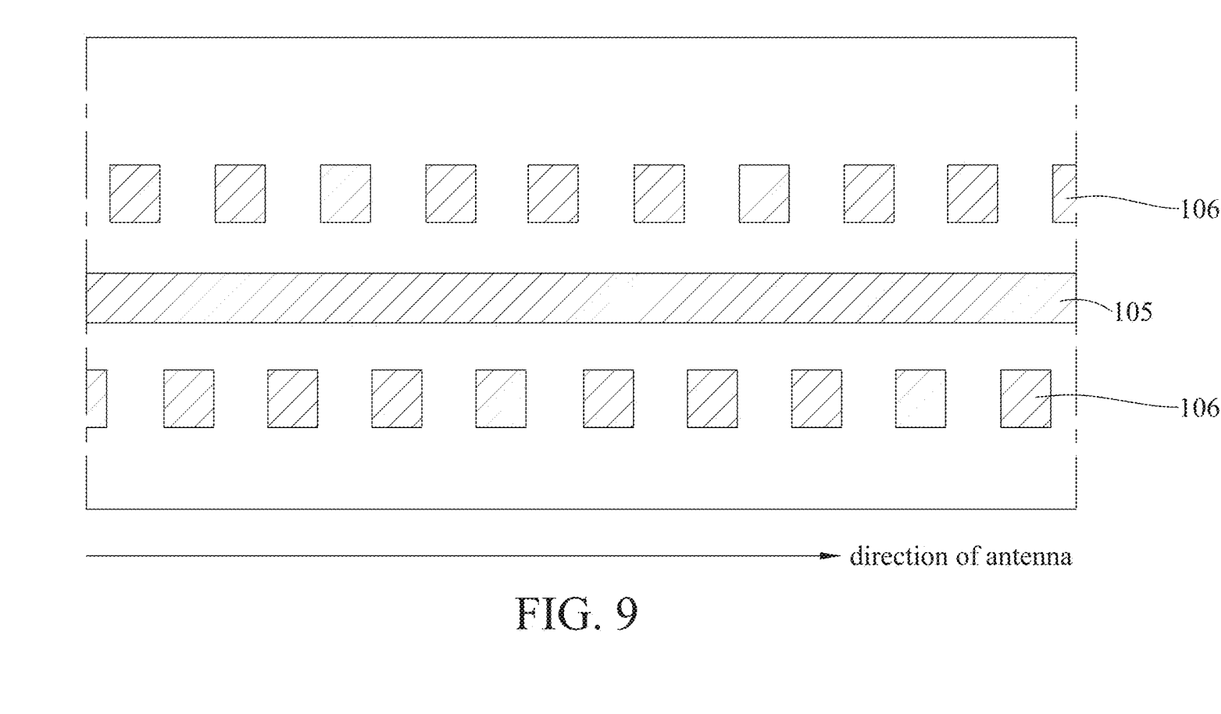
FIG. 9 is a partial view illustrating a variation of the optical waveguide antenna of the phase-controlled optical waveguide antenna array according to an embodiment of the present invention.

Reference is next made to FIG. 9, which is a partial view illustrating a variation of the optical waveguide antenna of the phase-controlled optical waveguide antenna array according to an embodiment of the present invention. From FIG. 9, it can be seen that the two periodic block structures 106 surrounding an optical waveguide 105 have a relative phase shift or position shift along the antenna direction. To be more specific, the two periodic block structures 106 surrounding on each side of each optical waveguide 105 are staggered (or phase shifted). In this regard, the light emitting rate of each block 106 may be decreased, which results in better and more uniform light emitting efficiency for the optical waveguide 105.

Reference is next made to FIG. 9, which is a partial view illustrating a variation of the optical waveguide antenna of the phase-controlled optical waveguide antenna array according to an embodiment of the present invention. From FIG. 9, it can be seen that the two periodic block structures 106 surrounding an optical waveguide 105 have a relative phase shift or position shift along the antenna direction. To be more specific, the two periodic block structures 106 surrounding on each side of each optical waveguide 105 are staggered (or phase shifted). In this regard, the light emitting rate of each block 106 may be decreased, which results in better and more uniform light emitting efficiency for the optical waveguide 105.

In sum, due to the continuing developments for photonic integrated circuit, LIDAR chip can be manufactured through CMOS manufacturing, as an integrated silicon photonic chip. The optical waveguide antenna for diffraction grating is a key component for optical phase control array, and it is used to make the light to be transmitting through the optical waveguide antenna array chip to focus at far field, and is with smaller divergence angle. Diffraction grating has been studied in the field for many years. However, due to the fact that the refraction coefficient within the waveguide being greater, most of the lights focus at the front end of the grating, which means that the light output travels along the traversing direction and decrease rapidly, so that the output light has a greater beam divergence and affects the spatial resolution. The newly disclosed diffraction grating (i.e., optical waveguide antenna array 103 of the present invention) can uniformly emit light along the longer grating, so as to decrease the light divergence and to increase the spatial scanning resolution. Comparing to prior art, in which only certain parameters such as the width and thickness of a waveguide are adjusted, the present invention provides greater flexibility in terms of design, greater tolerance for lithography and etching manufacturing, so as to realize smaller light beam divergence.

In sum, the present invention directs laser light source into the waveguide, splits the light into multiple paths of waveguide over the optical splitter, utilizes thermo-optic effect or phase modulation to adjust the phase of the light from the multiple paths, and transmits the lights to the specially designed light grating waveguide to uniformly emit the lights as a perpendicular direction. Furthermore, by utilizing the relative phase delay of the phase control adjacent optical waveguide antenna, the beam caused by interference is beam formed, so as to decrease the beam light divergence, and to change the beam angle over adjusting the phase. Moreover, one of the key points of the present invention is to exhibit the waveguide equipped with isolation side structure, so as to achieve uniform light emission.

In sum, the present invention adopts multi-mode interferometer for the design of optical splitter, so as to make sure that mass production is viable. In terms of the design for phase shifter, the present invention adopts long-shaped thermal phase shifter. By thermal distribution simulation, the phase shifter is properly distributed, so as to prevent the interference caused by residual heat between elements. Further, other kinds of phase shifter may also be adopted, such as phase modulation phase shifter.

In sum, in terms of the design of the optical waveguide antenna, the structure thereof is to insert periodic block structure in between two lines of optical waveguide. Such periodic block structure waveguide provides the diffraction grating to possess the ability to change the light direction to be perpendicular output, and the function to control light angle. The gradually varied width and the light filed coupling rate of the optical waveguide antenna can also be used to adjust the diffraction light ratio. In order for the light to be emitted along the direction of the optical waveguide antenna, the width of the block structure waveguide should be widen gradually. Further, in order to block the light coupling between the optical waveguide antennas, the gradually varied in width and periodic structure as disclosed in the present invention also possesses the ability to isolate the light coupling effect between the waveguide antenna, so as to tighten the arrangement between the optical waveguide antenna to achieve ultra-density optical waveguide antenna array.

In sum, by gradually varying the width for the periodic block structure, the near field light distribution can be further uniform to achieve smaller beam divergence. Greater tolerance for lithography and etching manufacturing is also achieved in the present invention. The structure as disclosed in the present invention also benefits for minimizing the far field beam emitted by the antenna.

In sum, one of the features of the present invention is to modify the shallow etching side grating silicon waveguide antenna, by utilizing the gradually-varied width periodic block structure to provide uniform light scattering and to isolate the light coupling between the waveguide. Further, the present invention is designed as a waveguide array antenna with high density to increase the purity of the antenna light beam (i.e., side lobe being far away from main lobe).

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A phase-controlled optical waveguide antenna array, comprising:
    an optical splitter, dividing an input light signal to a plurality of optical waveguides;
    an array of phase shifters, with one phase shifter among the array being connecting with one output optical waveguide of the optical splitter; and
    an optical waveguide antenna array, with optical waveguide antenna among the array being connecting with the phase shifter;
    wherein a periodic block structure, connected with a narrow width waveguide, is provided on each side of each optical waveguide antenna, whereby the period block structure and the optical waveguide antennas are disposed on a plane in order to provide optical diffraction and to decrease the optical coupling between the waveguide antennas.

2. The phase-controlled optical waveguide antenna array of claim 1, wherein the optical splitter is a one-to-N multi-mode interference.

3. The phase-controlled optical waveguide antenna array of claim 2, wherein the optical splitters are connected in series to form a tree-like multi stage structure.

4. The optical waveguide antenna array of claim 3, wherein at each stage, the optical splitter divides the light signal into two paths, and the light ratio for each path are substantial identical.

5. The phase-controlled optical waveguide antenna array of claim 1, wherein the periodic block structure forms a serial rectangular waveguide structure.

6. The phase-controlled optical waveguide antenna array of claim 5, wherein the material for the serial rectangular waveguide structure is silicon.

7. The phase-controlled optical waveguide antenna array of claim 1, wherein the width of the periodic block structure gradually varies along the direction of an antenna.

8. The phase-controlled optical waveguide antenna array of claim 7, wherein the two periodic block structures surrounding an optical waveguide have a relative phase shift or position shift along the antenna direction.

9. The phase-controlled optical waveguide antenna array of claim 1, wherein the duty cycle of the periodic block structure gradually varies along a direction of an antenna.

10. The phase-controlled optical waveguide antenna array of claim 1, wherein the phase shifter is implemented as a waveguide close to a heating element.

11. The phase-controlled optical waveguide antenna array of claim 1, wherein the phase shifter is an electrode-controlled phase modulator.

\* \* \* \* \*